United States Patent
He et al.

(10) Patent No.: US 10,650,232 B2
(45) Date of Patent: May 12, 2020

(54) PRODUCE AND NON-PRODUCE VERIFICATION USING HYBRID SCANNER

(71) Applicants: Chao He, Happy Valley (HK); Meng Yu, Dundee (GB); Richard C. Quipanes, Cebu (PH); Em Parac, Cebu (PH); Kristoffer Dominic Amora, Mandue (PH)

(72) Inventors: Chao He, Happy Valley (HK); Meng Yu, Dundee (GB); Richard C. Quipanes, Cebu (PH); Em Parac, Cebu (PH); Kristoffer Dominic Amora, Mandue (PH)

(73) Assignee: NCR Corporation, Atlanta, GA (US)

( * ) Notice: Subject to any disclaimer, the term of this patent is extended or adjusted under 35 U.S.C. 154(b) by 310 days.

(21) Appl. No.: 13/975,479

(22) Filed: Aug. 26, 2013

(65) Prior Publication Data
US 2015/0054959 A1   Feb. 26, 2015

(51) Int. Cl.
| | |
|---|---|
| G06T 7/00 | (2017.01) |
| G06K 9/00 | (2006.01) |
| G06K 9/62 | (2006.01) |
| G06K 9/46 | (2006.01) |

(52) U.S. Cl.
CPC ........... *G06K 9/00523* (2013.01); *G06K 9/46* (2013.01); *G06K 9/62* (2013.01); *G06K 2209/17* (2013.01)

(58) Field of Classification Search
CPC .................. G06K 2209/17; G06K 9/00523
USPC ........................................................ 348/150
See application file for complete search history.

(56) References Cited

U.S. PATENT DOCUMENTS

| | | | |
|---|---|---|---|
| 5,546,475 A * | 8/1996 | Bolle et al. | 382/190 |
| 6,363,366 B1 * | 3/2002 | Henty | 705/400 |
| 6,366,696 B1 * | 4/2002 | Hertz et al. | 382/183 |
| 6,668,078 B1 * | 12/2003 | Bolle | G06K 9/4652 356/237.1 |
| 8,086,017 B2 | 12/2011 | He et al. | |
| 8,117,071 B1 * | 2/2012 | Fitch | G06Q 20/201 235/462.01 |
| 8,286,868 B2 | 10/2012 | Edwards | |
| 8,292,181 B1 * | 10/2012 | Collins, Jr. | G06K 7/0004 235/462.11 |
| 8,479,995 B2 | 7/2013 | Gregerson | |
| 8,561,905 B2 * | 10/2013 | Edmonds | G06K 7/10554 235/462.14 |
| 8,805,092 B2 * | 8/2014 | Wakebe | 382/218 |
| 2006/0002607 A1 * | 1/2006 | Boncyk et al. | 382/165 |

(Continued)

OTHER PUBLICATIONS

Vincent, O.R. & Folorunso, O. (2009), "A Descriptive Algorithm for Sobel Image Edge Detection", Proceedings of Informing Science & IT Education Conference (InSITE) 2009, 97-107.

(Continued)

*Primary Examiner* — Jamie J Atala
*Assistant Examiner* — Joon Kwon
(74) *Attorney, Agent, or Firm* — Schwegman, Lundberg & Woessner (57) ABSTRACT

Approaches to produce verification are addressed which may be suitably employed in conjunction with a low resolution image scanner. Features, such as lines, corners, text, texture, edges and the like are extracted and compared with features for an identified item or evaluated to determine if the features collectively are indicative of a produce item or a non-produce item.

20 Claims, 12 Drawing Sheets

(56) References Cited

U.S. PATENT DOCUMENTS

| | | | |
|---|---|---|---|
| 2006/0261157 A1* | 11/2006 | Ostrowski et al. | 235/383 |
| 2008/0249884 A1* | 10/2008 | Knowles | A47F 9/046 705/23 |
| 2010/0252635 A1* | 10/2010 | Drzymala et al. | 235/462.41 |
| 2011/0170772 A1* | 7/2011 | Dharssi | G06Q 30/0276 382/165 |
| 2012/0000976 A1* | 1/2012 | Rollyson et al. | 235/375 |
| 2013/0232021 A1* | 9/2013 | Hagglund | 705/23 |
| 2014/0036630 A1* | 2/2014 | Herwig | G07G 1/0054 367/87 |

OTHER PUBLICATIONS

Ding, L. and Goshtasby, A. (2001), "Canny Edge Detector", Pattern Recognition, 34(3): 721-725.

Beliakov, G., et al. (2008), "Texture recognition by using GLCM and various aggregation functions", Proceedings of 2008 IEEE International Conference on Fuzzy Systems (IEEE World Congress on Computational Intelligence), Hong Kong, Sep. 2008, pp. 1472-1476.

Mosquera, A. & Cabello, D. (1996), "The Markov random fields in functional neighbors as a texture model: applications in texture classification", Proceedings of the 13th International Conference on Pattern Recognition, vol. 2: 815.

Fogel, I. & Sagi, D., "Gabor filters as texture discriminator", Biological Cybernetics, (1989), vol. 61(2); pp. 103-113.

Huang, P., et al. (2006), "Texture image retrieval and image segmentation using composite sub-band gradient vectors", Journal of Visual Communication and Image Representation, vol. 17(5), pp. 947-957.

Liu, Y. & Zhou, X. (2004), "Automatic texture segmentation for texture-based image retrieval", Proceedings of the 10th International Multimedia Modelling Conference (2004), pp. 285-290.

Zhao, G. & Pietikainen, M. (2006), "Local Binary Pattern Descriptors for Dynamic Texture Recognition", Proceedings of the 18th International Conference on Pattern Recognition (2006), vol. 2: 211-214.

Haralick, R. M., et al. (1973), "Textural features for image classification", IEEE Transactions on Systems Man and Cybernetics, SMC-3(6): 610-621.

Various Authors, International Journal of Computer Vision, vol. 23 (1) pp. 45-78 (1997).

Epshtein, B., et al. (2010), "Detecting Text in Natural Scenes with Stroke Width Transform", Proceedings of 2010 IEEE International Conference on Computer Vision and Pattern Recognition, pp. 2963-2970.

Cristianini, N. & Shawe-Taylor, J. (2000), "Support Vector Machines and other kernel-based learning methods", Cambridge University Press.

Tipping, M.E. & Smola, A. (2001), "Sparse Bayesian Learning and the Relevance Vector Machine", Journal of Machine Learning Research 1: 211-244.

Duda, R.O., et al. (2000), "Pattern Classification", John Wiley & Sons Inc.

Yuan, Y. & Shaw, M.J. (1995), "Induction of fuzzy decision trees", Fuzzy Sets and Systems, 69: 125-139.

Tomasev, N., et al. (2011), "A probabilistic approach to nearest-neighbor classification: naive hubness bayesian kNN", Proceedings of the 20th ACM international conference on Information and knowledge management (CIKM'11), pp. 2173-2176.

Radovanovic, M., et al. (2010), "Hubs in space: Popular Nearest Neighbors in High-Dimensional Data", Journal of Machine Learning Research, 11: 2487-2531.

\* cited by examiner

PRODUCE AND NON-PRODUCE VERIFICATION USING HYBRID SCANNER

FIELD OF THE INVENTION

The present invention relates generally to improvements to image based checkout scanners, and more particularly to product verification, as well as, product categorization and sub-categorization suitable for use in conjunction with low resolution gray scale camera output.

BACKGROUND OF THE INVENTION

In self-service checkout (SSCO), a common type of fraud is an item substitution fraud where a customer scans a lower priced item having a similar or the same weight. One existing SSCO system employs an NCR bi-optic 7878 hybrid scanner with a built in imaging module with a low-resolution gray scale camera.

In a different context, commercial demonstrations of camera based item recognition systems from a few vendors, such as Toshiba, Fujitsu and Evolution Robotics, have been made. The demonstrated systems have been mostly for recognizing the specific identities of produce and other product items at checkout. These systems have typically employed one or more high-resolution color cameras having a relatively high cost.

SUMMARY OF THE INVENTION

Among its several aspects, the present invention recognizes that unlabeled fruits or vegetables are often checked out by weight at a self-service terminal in a supermarket. A customer will usually be prompted to manually select the item category from a list on a touch screen. However, this approach opened the door for the so-called item substitution fraud at self-service check-out (SSCO), where expensive items, for example, whisky or an expensive cut of beef, or other meat, is checked out as a cheap produce item, such as bananas or potatoes. Furthermore, the present invention recognizes that solutions in retail environments, such as the grocery business, are notorious for having to be low cost. As a result, by contrast with the multiple color camera approaches, one proposed system according to the present invention advantageously uses the low-resolution gray scale camera of an existing hybrid scanner, and focuses on either the verification of an item as a particular item, such as bananas, or on a basic categorization, such as man-made versus produce, as well as, sub-categorization, as appropriate.

According to a presently preferred embodiment, a method employs an existing NCR bi-optic 7878 hybrid scanner with a low resolution gray scale imaging scanner including a camera for produce and non-produce item verification at an SSCO. By verification, the present application means either distinguishing between produce and non-produce items or verifying that an unknown item is in fact a particular item. Thus, if the shopper is prompted to select a produce item, such as bananas, the present method may be advantageously employed to confirm that produce was in fact weighed and not a steak, whiskey or some other expensive non-produce item being substituted as part of a substitution fraud. Further, the present invention may confirm that bananas were in fact weighed.

While it will be recognized that the methods of the invention may be readily adapted to a high-resolution color camera if and when the market supports the cost of adopting such a camera or cameras; and the techniques described can be extended beyond the task of distinguishing between produce and non-produce items, to recognizing such items without any pre-knowledge as to what the item might be; however, to reduce the cost and have minimal impact on the existing SSCO platform, the hybrid scanner low cost imaging module is primarily addressed herein.

One proposed system in accordance with the invention includes the following process for produce and non-produce categorization: (1) image acquisition, (2) object background subtraction, (3) feature extraction, including but not limited to extraction of straight lines, sharp corners, edges and texture, and characters and texts, as addressed further below and (4) classification.

Among the advantages of the present invention are that it can assist in detecting item substitution fraud at SSCO, and it may suitably utilize an existing NCR SSCO hardware platform. Thus it may be adopted with minimal impact on solution integration or upgrade. It is also quite effective for non-produce versus produce classification, as well as, produce or product sub-categorization, while advantageously utilizing an existing low-resolution and low cost gray scale camera.

A more complete understanding of the present invention, as well as further features and advantages of the invention, will be apparent from the following Detailed Description and the accompanying drawings.

DETAILED DESCRIPTION OF THE DRAWINGS

Figure 1:
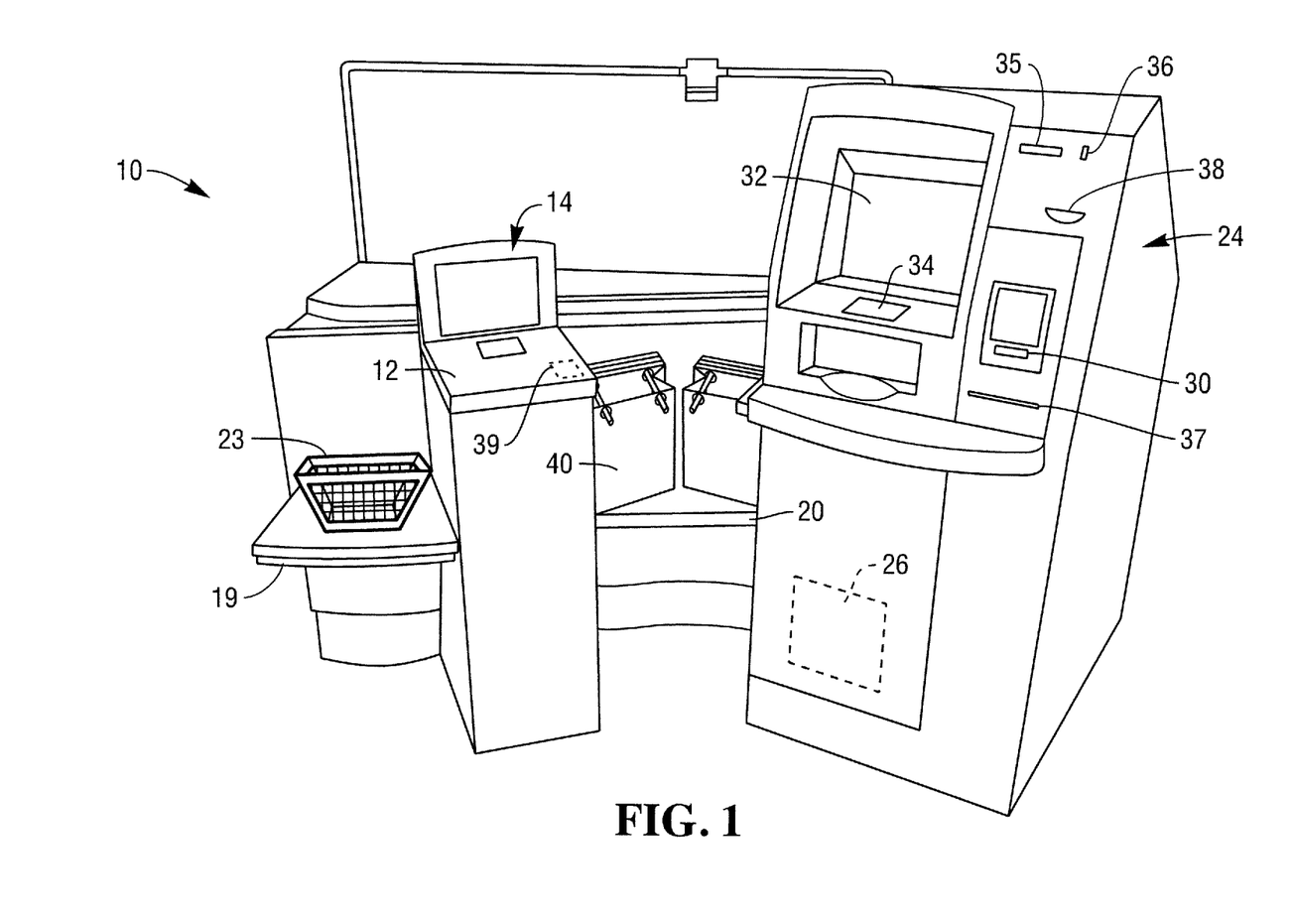
FIG. 1 shows an exemplary self-checkout system employing a first embodiment of the present invention.

FIG. 1 shows an exemplary self-checkout system 10 employing a first embodiment of the present invention. The terminal 10 includes a product weight scale 12, such as a produce scale, and a hybrid scanner 14 associated with the scale. Scanner 14 includes a low-resolution gray scale camera 15 as part of an image scanner to produce digital image data for digital image scanning, as well as, digital image data for products weighed as produce by a customer, as addressed further below. A bagging or security scale 20 is provided adjacent the scanner to support shopping bags into which the customer places each newly scanned item.

The terminal 10 includes a basket scale 19 configured to support a shopping basket 23 full of products. Each of the scales 12, 19 and 20 include at least one weight detector, such as a pressure sensor or a load cell sensor, which is operable to generate a signal in response to the weight of the item placed on the scale. A kiosk 24 includes a touchscreen display 32, data input device 34 and a payment device 30, as well as, a bill acceptor 35, coin acceptor 36, bill dispenser 37 and coin dispenser 38. An RFID tag reader 39 is incorporated within scale 12. A computer or processor 26 is resident within the terminal 10 and executes various software routines associated with the self-checkout process. In particular, processor 26 executes software implementing processes, such as the processes of FIGS. 5 and 6, for example, as discussed further below in connection with FIG. 2.

Figure 5:
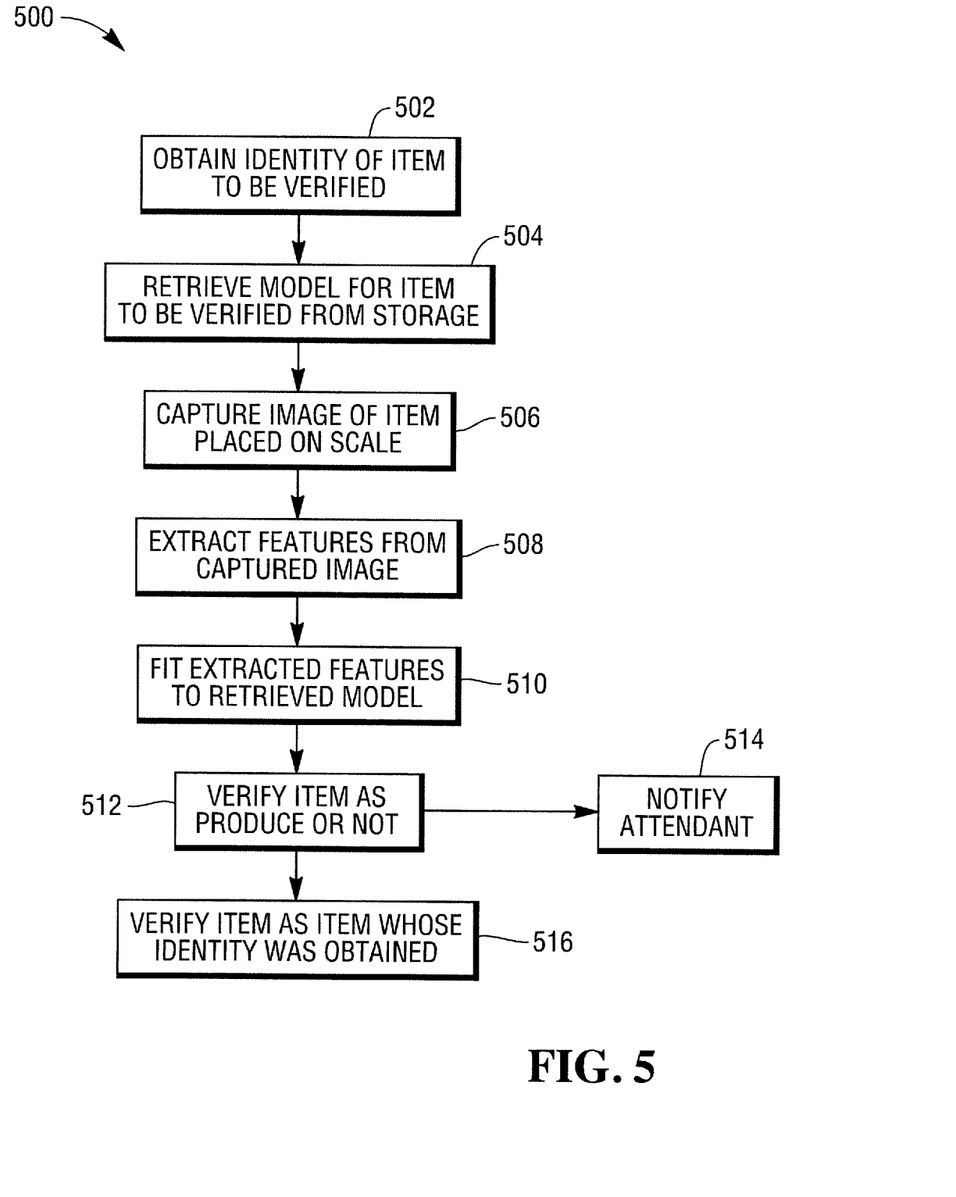
FIG. 5 shows a simplified process of item verification in accordance with the present invention.
Figure 6A:
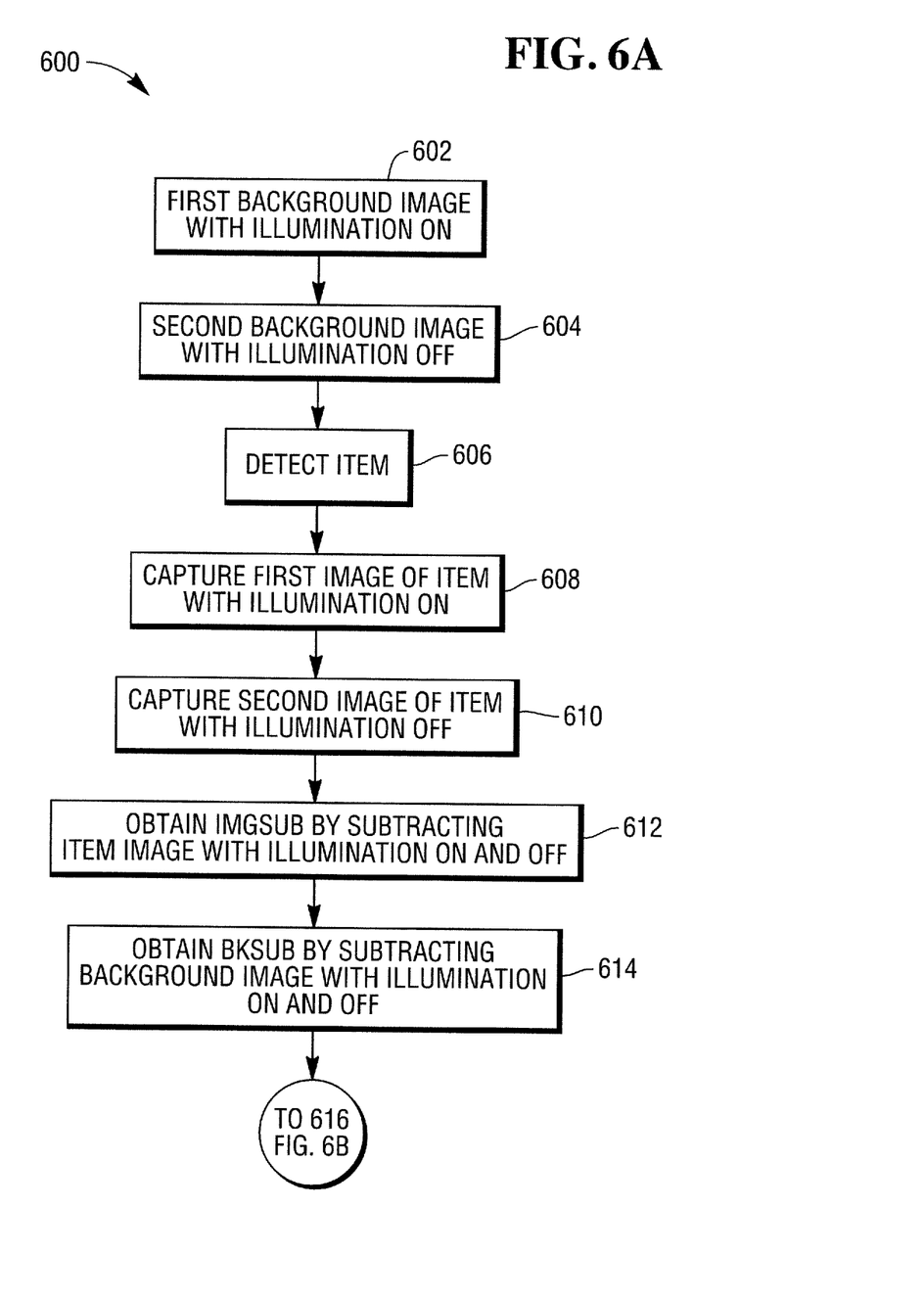
FIGS. 6A-6C (collectively FIG. 6) show a more detailed flowchart of one presently preferred process of item categorization and sub-categorization in accordance with the present invention.
Figure 6B:
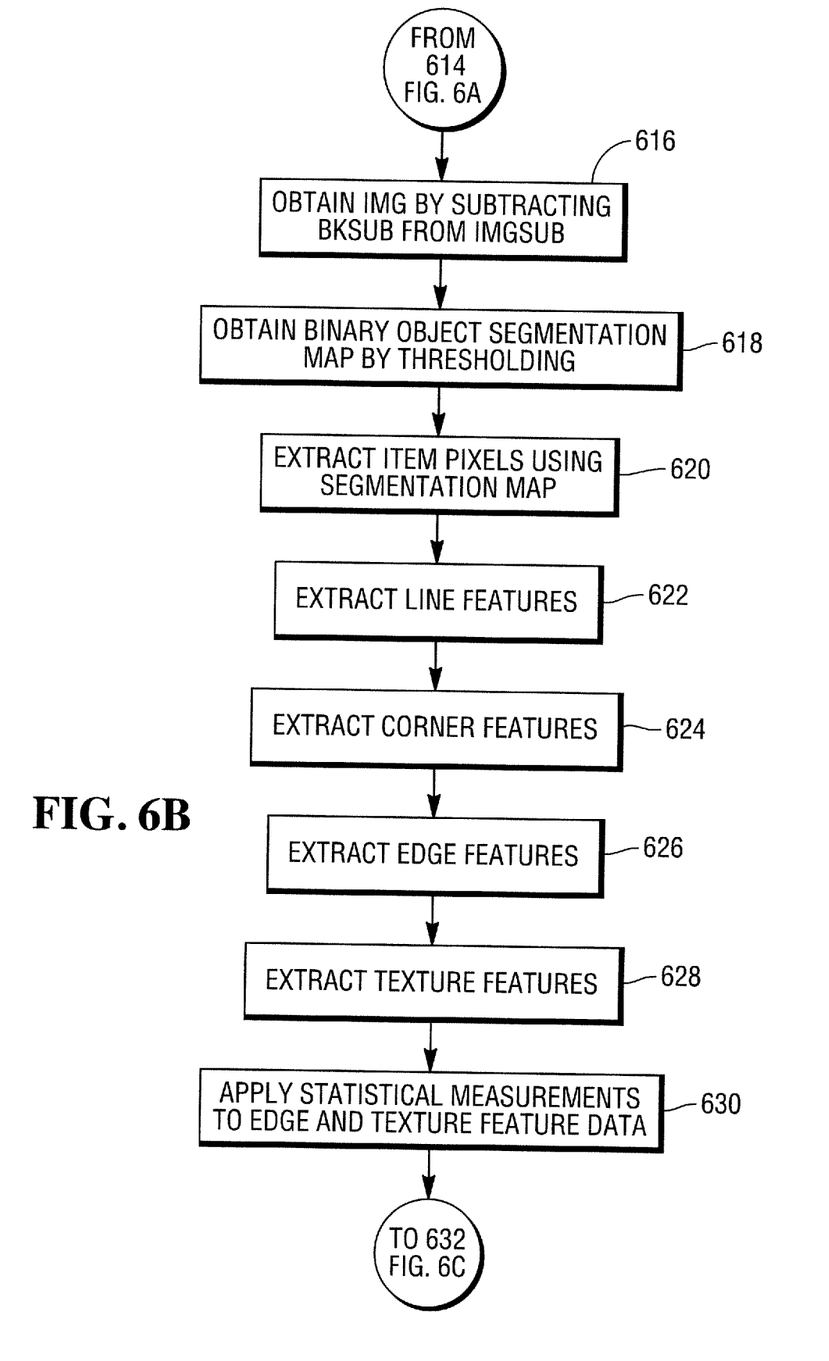
Figure 6C:
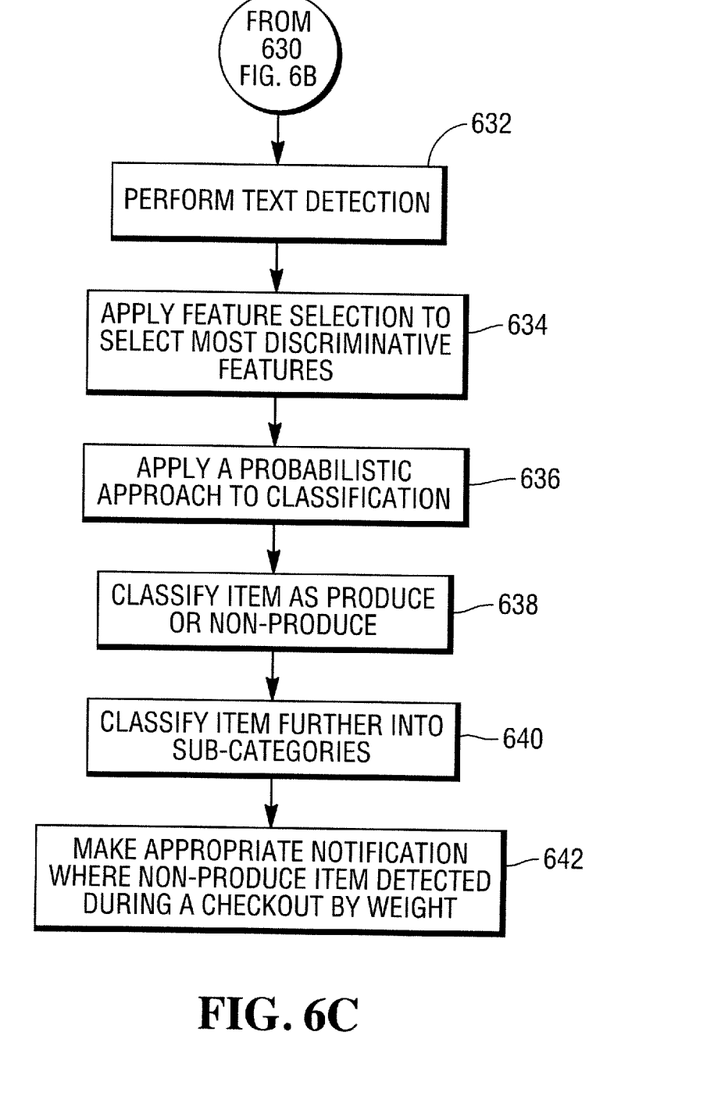

The present invention adds new intelligence to the self-checkout application software making it capable of operating to perform produce verification, as well as, product categorization and sub-categorization, as discussed further herein. As seen in the simplified FIG. 2 which shows illustrative components of the terminal 10, processor 26 receives inputs from scale 12, scanner 14 including camera 15, bagging scale 20, bill acceptor 35, coin acceptor 36, bill dispenser 37, coin dispenser 38, an RFID reader 39, a produce verification model database 51 and product categorization and sub-categorization database 53. It will be recognized that in some embodiments, processor 26 may communicate with a store server and a number of terminals 10 may similarly communicate with the store server to access a shared produce verification model database or product categorization and sub-categorization database.

Figure 2:
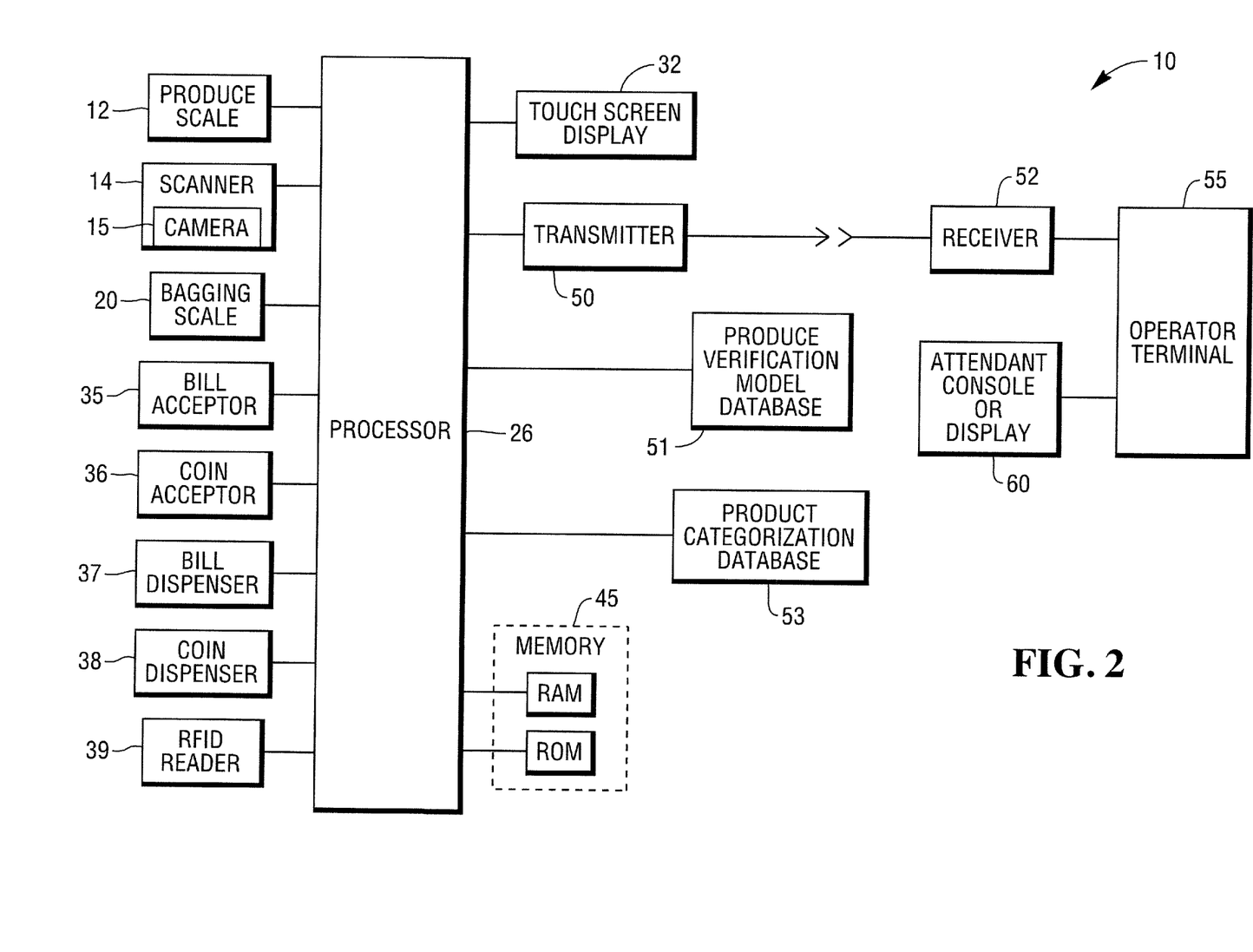
FIG. 2 is a block diagram of a portion of a central circuit for the self-checkout system of FIG. 1.

Processor 26 provides outputs to drive touch screen display 32. It has software memory 45 storing software which when executed controls the processor 26 to perform the methods and processes, and in particular, the processes of FIGS. 5 and 6, described further herein. It also wirelessly transmits an output to a receiver 52 of an operator terminal 55 which when received by terminal 55 causes that terminal to drive operator console or display 60 to alert an operator to potential problems. It will be recognized that alternatively or additionally an audio notification can be employed and a red or other light can light at self-checkout terminal 10 to further guide the attendant to any potential problem. Operator terminal 55 and console 60 are remote from the self-checkout terminal 10. In a typical store arrangement, a group of terminals 10 is overseen by a single attendant from an attendant station. While the discussion which follows focuses upon the produce verification and product categorization details of the present invention, further details of SSCO operation more generally are found in U.S. Pat. No. 8,286,868 which is assigned to the assignee of the present application and is incorporated by reference herein in its entirety.

In an exemplary use of the SSCO system 10 of FIG. 1 in a supermarket, unlabeled fruits or vegetables are often checked out by weight at the self-service terminal 10. The customer will usually be prompted to make a selection to weigh a produce item, and then to manually select the item category from a list on the touchscreen 32. However, as addressed briefly above, this arrangement opened the door for the so-called item substitution fraud at self-service check-out (SSCO), where expensive items, for example, whisky or beef, are checked out as cheap produce items, such as bananas.

The hybrid scanner 14 is capable of conducting both laser scanning and digital image scanning at the same time as discussed further below in connection with FIG. 3, and thus includes a laser scanner 145, and an imaging scanner including camera 15 controlled by the processor 26. The laser scanner 145 includes a laser generation device 350, a laser beam directing device 360 for directing a laser beam 355 generated by the laser generation device 350 and a photodetector 365 for detecting laser light reflected from an optical code, such as a bar code, back to the laser scanner 145. The laser scanner 145 also includes a pattern mirror 325 used to direct a laser beam 340 reflected by the laser beam directing device 360.

The imaging scanner 150 further includes an image capture device such as the low resolution digital camera 15 of the imaging scanner. When an optical code 300 on a product is presented to the hybrid optical code scanner 14, illumination LEDs 375 are turned on to illuminate the field of view of the digital camera 15 and the digital camera 15 captures an image of the optical code and the image is processed to recover data encoded in the optical code, thus operating as an optical character recognition (OCR) reader.

The scanner 14 communicates with external devices utilizing network communications. In some embodiments, the network is implemented using an industry standard USB bus that connects the hybrid optical code scanner 105 to the POS terminal 110, for example.

The hybrid optical code scanner 14 includes a housing 200 comprising a vertical housing component 210 and horizontal housing component 205. The vertical housing component 210 includes vertical scanning window 220 and the horizontal housing component 205 includes a horizontal scanning window 215. The vertical scanning window 220 faces the front of the hybrid optical code scanner 14. An operator or user of the hybrid optical code scanner 14 stands in front of the hybrid optical code scanner 14 facing the vertical scanning window 220 and moves the optical code 300 for scanning through a first volume of space 370 generally above the horizontal scanning window 215 and in front of the vertical scanning window 220.

Figure 3:
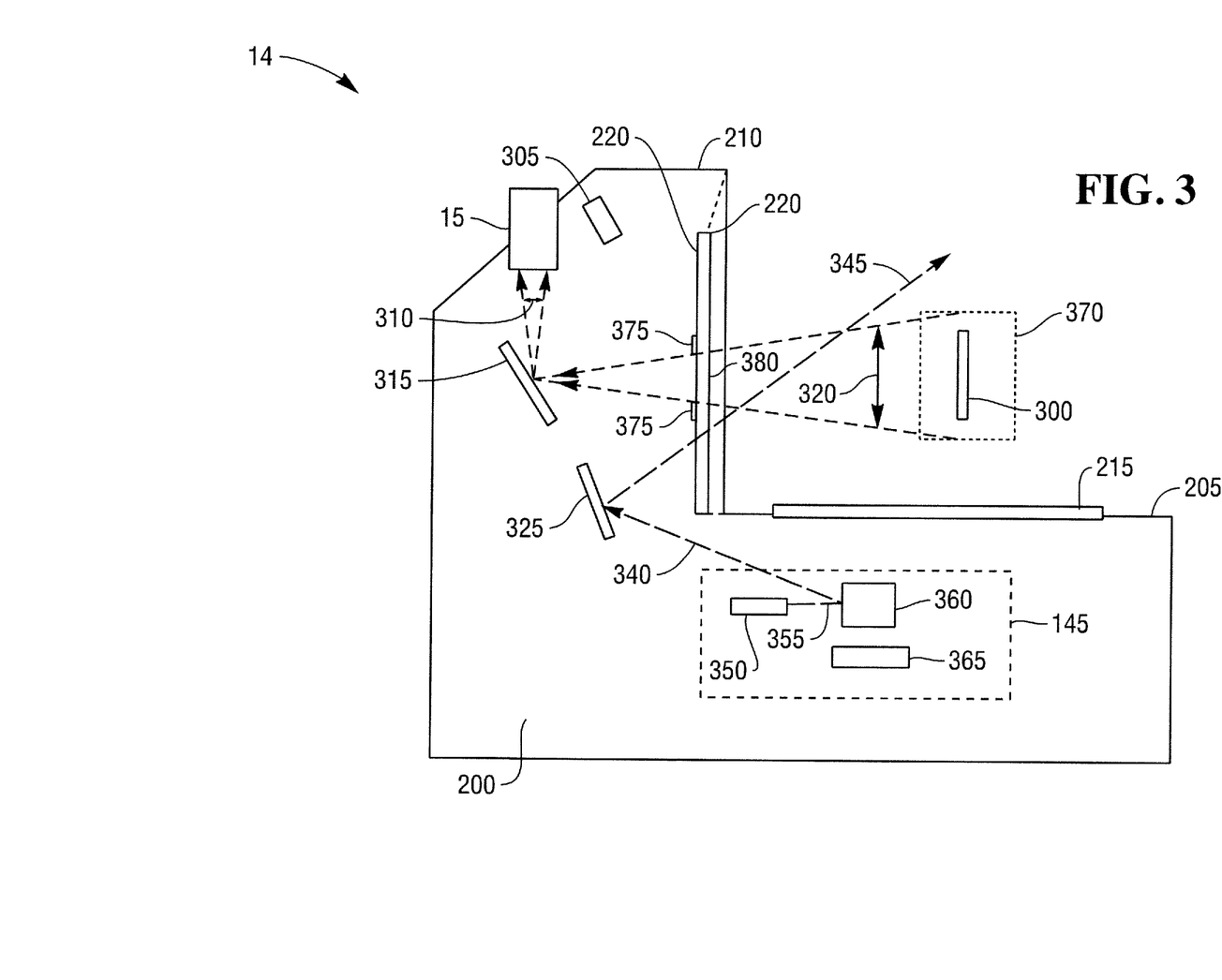
FIG. 3 shows an NCR 7878 bi-optic scanner suitable for use in the self-checkout system of FIG. 1, and illustrates the field of view of the imaging camera employed therein.

With further reference to FIG. 3, the pattern mirror 325 is one of a plurality of pattern mirrors (not shown). The pattern mirror 325 receives the laser beam 340 from a laser beam directing device 360 and reflects the laser beam 345 through the vertical scanning window 220 to an area in front of the vertical scanning window 220 and generally over the horizontal scanning window 215. In some embodiments, the area the laser beam 345 is directed to may extend past the perimeter of the horizontal scanning window 215. The laser beam directing device 360 causes the laser beam 345 to move so that it scans a second volume of space. If the laser beam 345 strikes and moves across an optical code, the reflected laser light is directed (directing devices not shown) back to the laser scanner 145 where the laser light is detected to the photodetector 365 and data encoded in the optical code read. Laser scanners, in general, are best suited to read one dimensional (1D) barcodes which are included as an optical code.

Other optical codes, such as a two dimensional (2D) barcode, are presented to the hybrid optical code scanner 14 to be read by the imaging scanner utilizing digital camera 15. A first image of the optical code travels along a first path 320 through the vertical scanning window 220 to a mirror 315 where it is reflected along a second path 310 to the digital camera 15 and is captured for processing. The first path 320 is not a thin line like a laser beam but is a wider path that allows the digital camera 15 of the imaging scanner to capture a complete image of the optical code 300.

The optical code 300 is positioned over the horizontal scanning window 215 and in front of the vertical scanning window 220 in the sweet spot 370 of the imaging scanner. When an optical code is in the sweet spot 370, it will fall within the field of vision and depth of field for the digital camera 15. This means that the optical code will be visible and in focus when it is located in the sweet spot 370 and facing the vertical scanning window 220. The discussion now turns to further details of produce verification and product characterization. It will be recognized that further aspects of hybrid image scanning can be employed in conjunction with the present invention. For further details, see U.S. Pat. No. 8,479,995 assigned to the assignee of the present application and incorporated by reference herein in its entirety.

Unlike man-made products having barcode labels, for unlabeled fruits or vegetables, there is typically no barcode to be scanned. People intent on defrauding the system may use cheap produce items, for example, bananas to substitute for an expensive product when committing item substitution checkout fraud.

While it will be recognized that a high-resolution color camera may be employed for the task of distinguishing between produce and non-produce items, to reduce the cost and have minimal impact on the existing SSCO platform, an existing low resolution hybrid scanner imaging module is primarily considered in this invention.

This imaging module can only capture low resolution (96 dpi) gray scale images. As addressed further below, it was found that the images from this module are best suited for verifying an item of produce as a previously identified item, or conducting produce versus non-produce categorization and sub-categorization, rather than produce or product identification of an unknown item.

Figure 4:
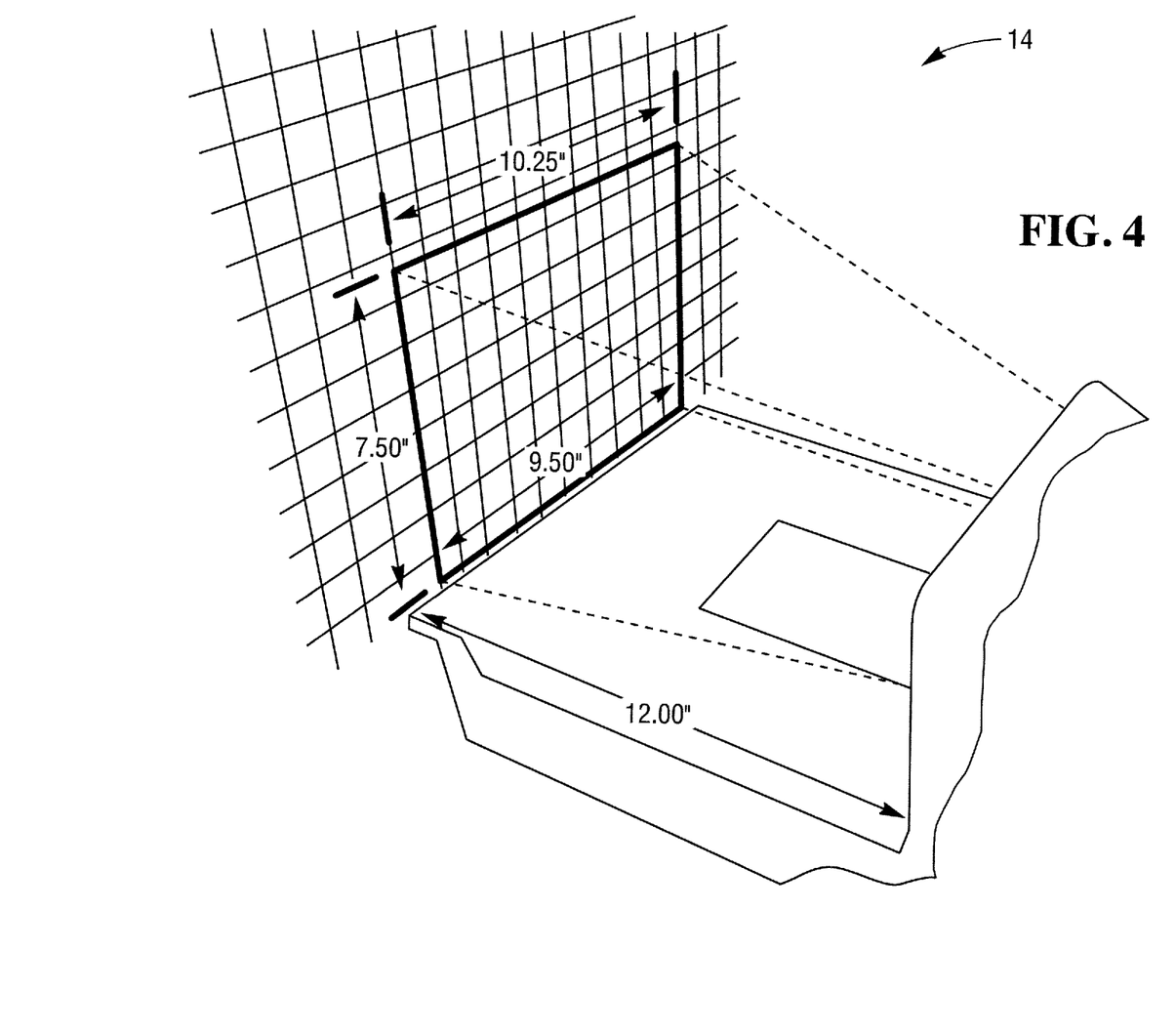
FIG. 4 illustrates the field of view of the scanner of FIG. 3.

In the present application, the low resolution imaging module or camera 15 is installed behind the vertical glass of a hybrid NCR 7878 bi-optic scanner 14. FIG. 4 illustrates the field of view of the scanner 14. The discussion which follows below describes the exemplary processes 500 and 600 of produce verification, or produce versus non-produce categorization using a hybrid scanner like scanner 14.

FIG. 5 shows a simplified process of item verification 500 in accordance with the present invention. In step 502, a user selects an item to be weighed such as bananas. For example, the user selects produce from a menu on touchscreen display 32 and then selects bananas from a sub-menu displayed thereon. Alternatively, if an item to be weighed has a bar code, a prior knowledge of what the item is can be gained by scanning the bar code. In step 504, the model for the bananas is retrieved from storage, such as produce verification model database 51 which may advantageously store verification model data. In step 506, an image of an actual item placed on a scale, such as scale 12, is captured, for example, by digital camera 15. In step 508, features are extracted from the captured image. In step 510, the extracted features are fit to the model retrieved in step 504. In step 512, the item is verified as a produce item or not. If not, an attendant may be notified in step 514. Further, in step 516, the item may be verified as the item whose identity was obtained in step 502 if the product image is sufficiently clear and extracted features fit the retrieved model sufficiently closely.

FIG. 6 addresses a process of categorization and sub-categorization where the process begins with an unknown item and no prior knowledge as to what the item is. In FIG. 6, process 600 begins with a series of image acquisition steps 602, 604, 606, 608 and 610. Before each item transaction, a first background image is taken by the camera 15 with the illumination LEDs 375 on in step 602. In step 604, a second background image is taken by the camera 15 with the illumination LEDs 375 off. In step 606, an item is detected, for example, when a user places a first item on the scale to be weighed. The camera 15 will be activated again to capture two images of the items with the LEDs on and off in steps 608 and 610, respectively.

Process 600 continues with a series of object background subtraction steps in which the background is subtracted from the images to obtain the object only part of the image. To increase the robustness, images of both LEDs on and off are used, as follows. In step 612, imgsub is obtained by subtracting the object images of LED-ON and LED-OFF. In step 614, bksub is obtained by subtracting the background images of LED-ON and LED-OFF. In step 616, img is obtained by subtracting bksub from imgsub. In step 618, a binary object segmentation map is obtained by thresholding. Finally, in step 620 object pixels are extracted from the original images using the segmentation map from step 618. For further exemplary details of creating and utilizing segmentation maps, see, for example, U.S. Pat. No. 8,086,017 assigned to the assignee of the present invention and incorporated by reference herein in its entirety.

Figure 7A:
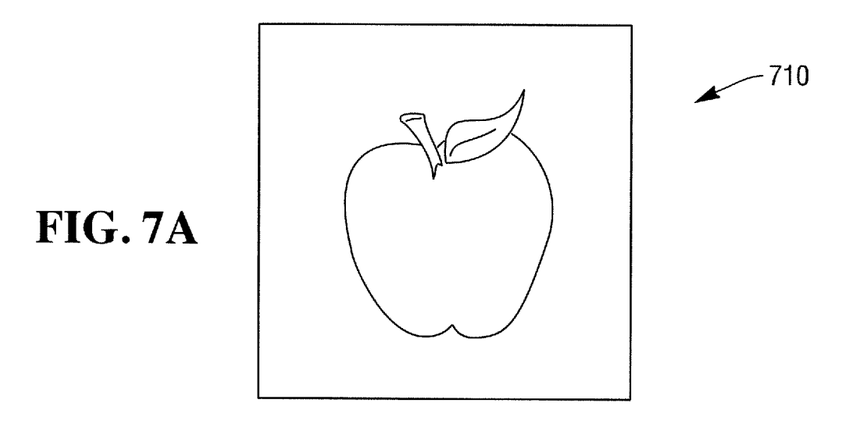
FIG. 7A shows an illustration of an image of an apple.
Figure 7B:
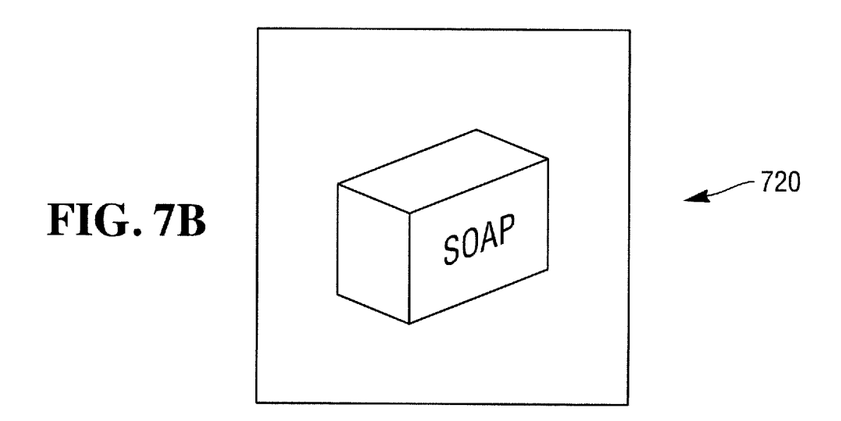
FIG. 7B shows an illustration of an image of a bar of soap packaged in a box.

Next process 600 proceeds to feature extraction. During feature extraction a plurality of diverse features, which are suitable for differentiating produce items from non-produce or man-made items, are extracted from the segmented object image. These features may advantageously include but are not limited to the following steps. In step 622, straight lines, including their number, lengths, and relationships such as parallel, orthogonal, or crossed. This can be detected using a Hough line detector as described in further detail by D. A. Forsyth, "Computer Vision: A Modern Approach", ($1^{st}$ edition) Prentice Hall which is incorporated herein in its entirety. The present invention recognizes that non-produce items usually have many more line features than produce items. As one example, compare the illustrations of an apple and a man-made bar of soap sold in a box 720 of FIGS. 7A and 7B, respectively.

Sharp corners also appear more often on non-produce items than on produce items. In step 524, this distinction can be detected and evaluated by a Susan corner detector, such as described by S. M. Smith and J. M. Braddy, "SUSAN—a new approach to low level image processing" which is incorporated herein in its entirety.

Edge and texture patterns of produce and non-produce items are often quite different. Produce items often display more uniform patterns than non-produce items. Edges can easily be extracted by using an edge detector in step 626. See, for example, Sobel detectors as described in Vincent, O. R. & Folorunso, O. (2009), "A Descriptive Algorithm for Sobel Image Edge Detection", *Proceedings of Informing Science & IT Education Conference (InSITE)* 2009, 97-107 which is incorporated herein in its entirety or Canny detectors as described in Ding, L. and Goshtasby, A. (2001), "Canny Edge Detector", *Pattern Recognition,* 34(3): 721-725 which is incorporated herein in its entirety.

Texture can also be extracted by using texture detection in step 628, for example, Co-Occurrence Matrices, such as described in Beliakov, G., et al. (2008), "Texture recognition by using GLCM and various aggregation functions", *Proceedings of* 2008 *IEEE International Conference on Fuzzy Systems (IEEE World Congress on Computational Intelligence),* Hong Kong, September 2008, pp. 1472-1476, which is incorporated herein in its entirety; Markov Random Fields such as described in Mosquera, A. & Cabello, D. (1996), "The Markov random fields in functional neighbors as a texture model: applications in texture classification", *Proceedings of the 13th International Conference on Pattern Recognition*, Vol. 2: 815, which is incorporated herein in its entirety; Gabor filters such as described in Fogel, I. & Sagi, D., "Gabor filters as texture discriminator", *Biological Cybernetics*, (1989), Vol. 61(2); pp. 103-113, which is incorporated herein in its entirety; an image gradient such as described in Huang, P., et al. (2006), "Texture image retrieval and image segmentation using composite sub-band gradient vectors", *Journal of Visual Communication and Image Representation*, Vol. 17(5), pp. 947-957 and Liu, Y. & Zhou, X. (2004), "Automatic texture segmentation for texture-based image retrieval", *Proceedings of the 10th International Multimedia Modelling Conference* (2004), pp. 285-290, which are incorporated herein in their entirety; and local binary features such as described in Zhao, G. & Pietikainen, M. (2006), "Local Binary Pattern Descriptors for Dynamic Texture Recognition", *Proceedings of the 18th International Conference on Pattern Recognition* (2006), Vol. 2: 211-214, which is incorporated herein in its entirety, and the like.

From edge and texture extracted data, statistical measurements such as homogeneity, inertia, entropy, and energy such as described in Haralick, R. M., et al. (1973), "Textural features for image classification", *IEEE Transactions on Systems Man and Cybernetics*, SMC-3(6): 610-621, which is incorporated herein in its entirety, can also be extracted to serve as further features in step 630. International. Journal of Computer Vision, Vol. 23 (1) pp. 45-78 (1997) is also incorporated by reference herein in its entirety.

Characters and texts usually only appear on non-produce or man-made items. They can be detected using any optical character recognition (OCR) detector. To increase the computational efficiency and considering the current approach does not require recognizing what the individual characters are, as opposed to determining that they are in fact characters, some simple text detector such as Stroke Width Transform (SWT) such as described in Epshtein, B., et al. (2010), "Detecting Text in Natural Scenes with Stroke Width Transform", *Proceedings of 2010 IEEE International Conference on Computer Vision and Pattern Recognition*, pp. 2963-2970, which is incorporated by reference herein in its entirety, can be suitably applied in step 632.

Process 600 then proceeds to classification. With suitable features extracted, many state-of-the-art classification methods can be applied, such as support vector machines (SVM) such as described in Cristianini, N. & Shawe-Taylor, J. (2000), "Support Vector Machines and other kernel-based learning methods", Cambridge University Press, which is incorporated by reference herein in its entirety; Relevance Vector Machines (RVM) such as described in Tipping, M. E. & Smola, A. (2001), "Sparse Bayesian Learning and the Relevance Vector Machine", *Journal of Machine Learning Research* 1: 211-244, which is also incorporated by reference herein in its entirety; a logistic regression classifier; K-Nearest-Neighbors (KNN); neural networks; genetic algorithms such as described in Duda, R. O., et al. (2000), "Pattern Classification", John Wiley & Sons Inc., which is incorporated by reference herein in its entirety; and decision trees such as described in Yuan, Y. & Shaw, M. J. (1995), "Induction of fuzzy decision trees", *Fuzzy Sets and Systems*, 69: 125-139, which is incorporated by reference herein in its entirety.

With heterogeneous features available, it is also possible to apply multiple classifier combination or hierarchical classification methods. A feature selection step 634 can be performed to select the most discriminative features. One suitable implementation employs a so-called Naïve Hubness Bayesian KNN classifier such as described in Tomasey, N., et al. (2011), "A probabilistic approach to nearest-neighbor classification: naive hubness bayesian kNN", *Proceedings of the 20th ACM international conference on Information and knowledge management* (CIKM'11), pp. 2173-2176, and in Radovanovic, M., et al. (2010), "Hubs in space: Popular Nearest Neighbors in High-Dimensional Data", *Journal of Machine Learning Research,* 11: 2487-2531 which are incorporated by reference herein in their entirety, in step 636, which is simple, fast and powerful.

Figure 8:
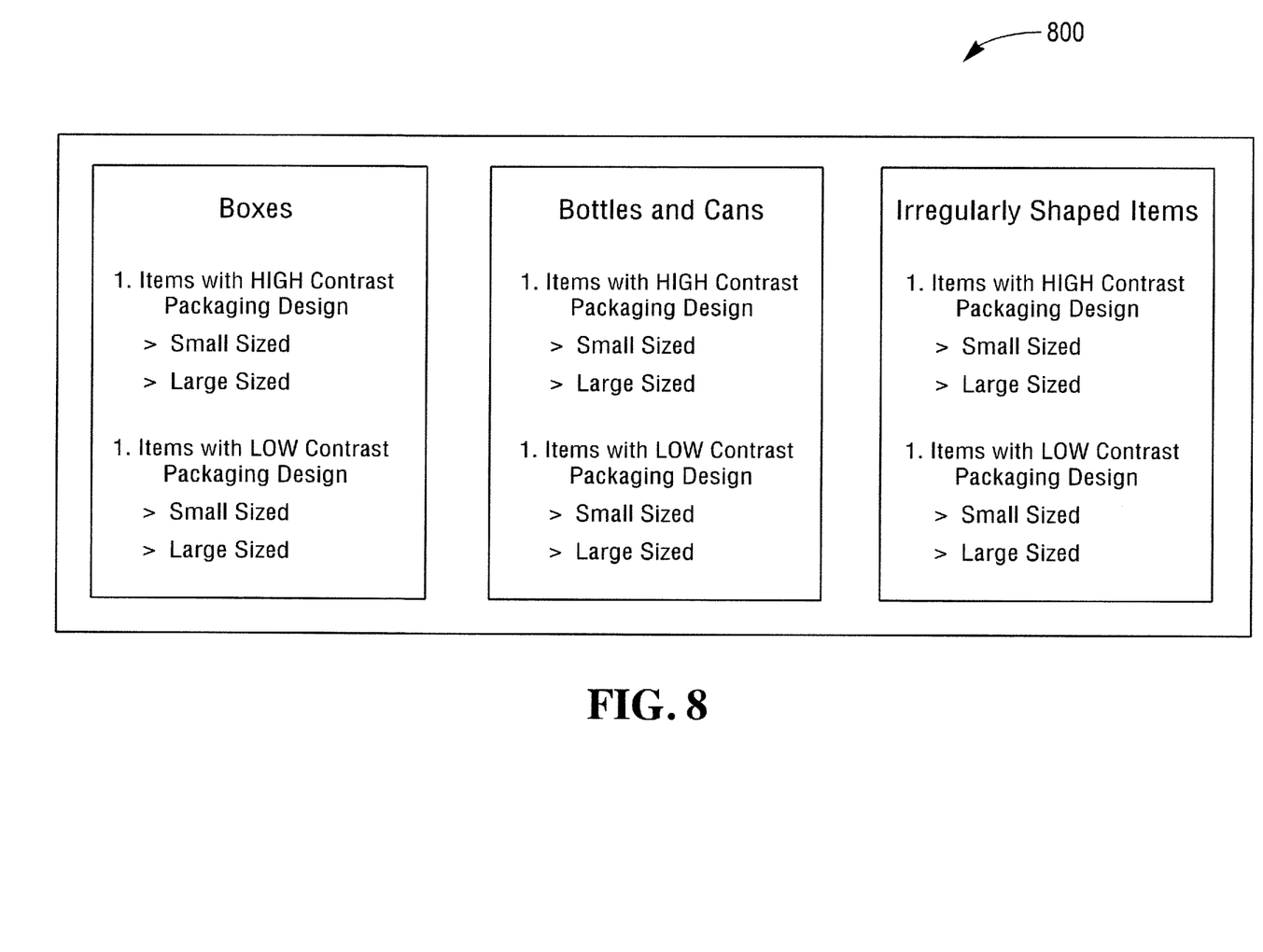
FIG. 8 shows an exemplary categorization approach for man-made items.
Figure 9:
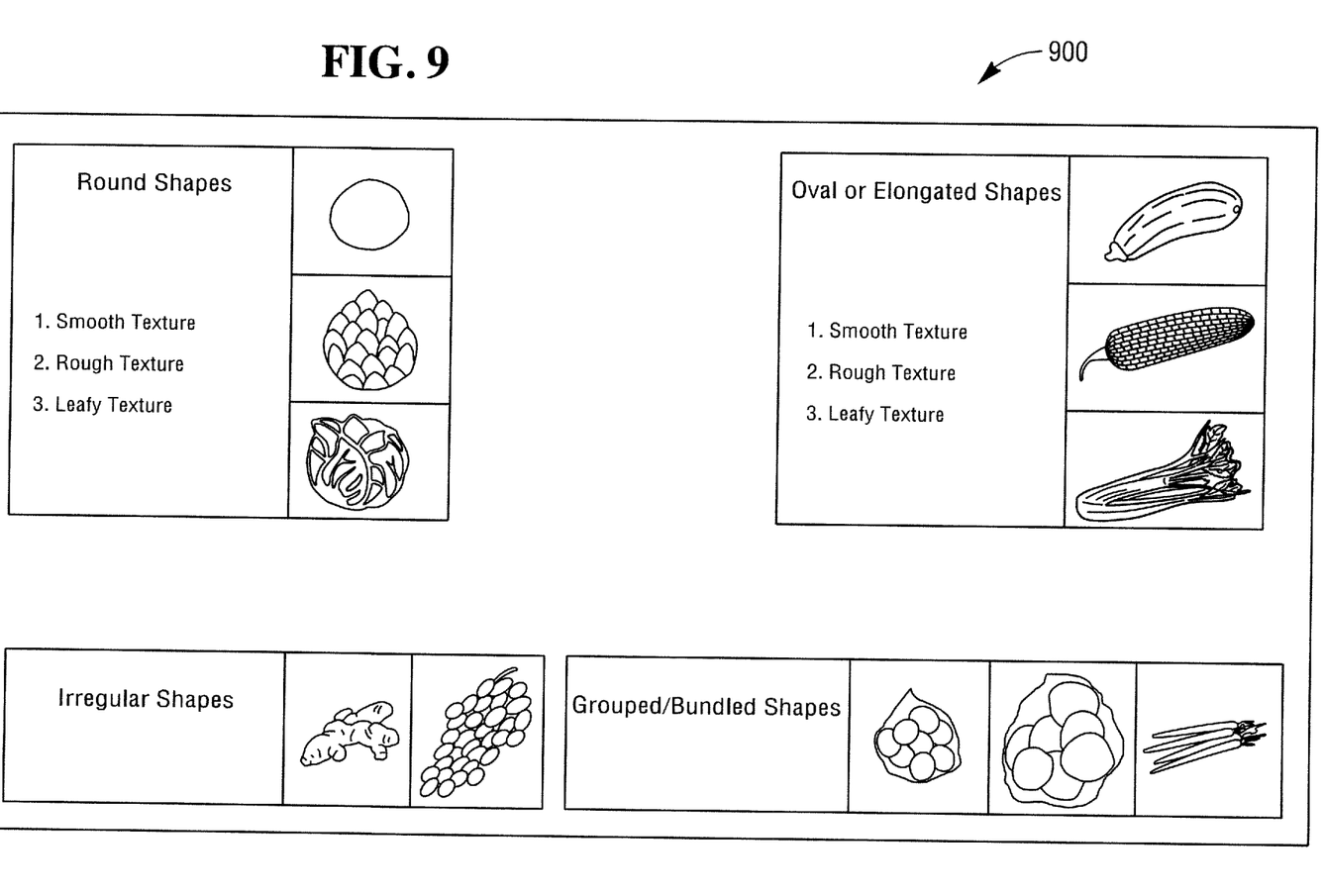
FIG. 9 shows an exemplary categorization approach for produce items.

Within the classification step, two tasks can preferably be performed. One is to classify items into either produce or non-produce classes in step 638, and the second is to further classify them into subcategories for example in terms of packaging materials (boxes or bottles and cans), packaging design (high-contrast or low-contrast), object shape (rectangular, round, oval, or irregular), and object amount (single item or bundled items) and so on, in step 640. FIGS. 8 and 9 show examples of further sub-categorization. Non-produce may also be referred to herein as man-made.

Upon a positive detection of non-produce items during a checkout by weight, a variety of follow-up decisions can be made in step 642, for example, raise an alarm, notify the user with a warning message on screen and ask for confirmation, send a message to store SSCO controlling console to request a member of staff to verify, or the like.

Experiments show that the proposed system can effectively differentiate most non-produce items from produce items. The proposed system can also perform relatively accurate subcategory classification. Among all features, the line features were found to be the most effective for non-produce versus produce classification in a current embodiment.

More particularly, a data set was generated for 81 man-made items with 20 images taken for each item for a total of 1,620 images. Similarly, a data set was generated for 54 produce items with 20 images taken for each item for a total of 1,080 images. Preliminary results for Susan corner and Hough line features showed a significant difference between man-made or non-produce items and produce items on average. The preliminary results also supported an ability to effectively recognize sub-classes. For example, the number of Susan corners for box items was clearly higher than that for other items. Additionally, the number of Susan corners for oval, elongated and round produce items were clearly lower than that of other items.

Preliminary results for Hough lines analysis showed boxes clearly having larger values. The same was true for a Hough lines distance analysis, but interestingly other categories could easily be mis-verified using this test. Size testing supported the subcategories: large, small and produce items.

Text and character feature results showed that box items and low contrast bottles and cans had expected higher results, but variable textures of leafy produce items were also incorrectly extracted as text or characters.

A further data set derived from 1060 images, with 660 for produce and 400 for man-made items, was analyzed with respect to textures and produced a high likelihood of correctly recognizing produce, but was much less accurate in recognizing man-made items.

From the above, several conclusions were reached. First, it is desirable in connection with data collection to group items and images. For example, the following categories appear advantageous: man-made or non-produce versus produce, shapes (box, bottle/can, irregular; round, oval, irregular), by size (small, large), by contrast (higher, lower), by texture (smooth, rough, leafy), and by single item versus grouped or bundled.

Figure 10:
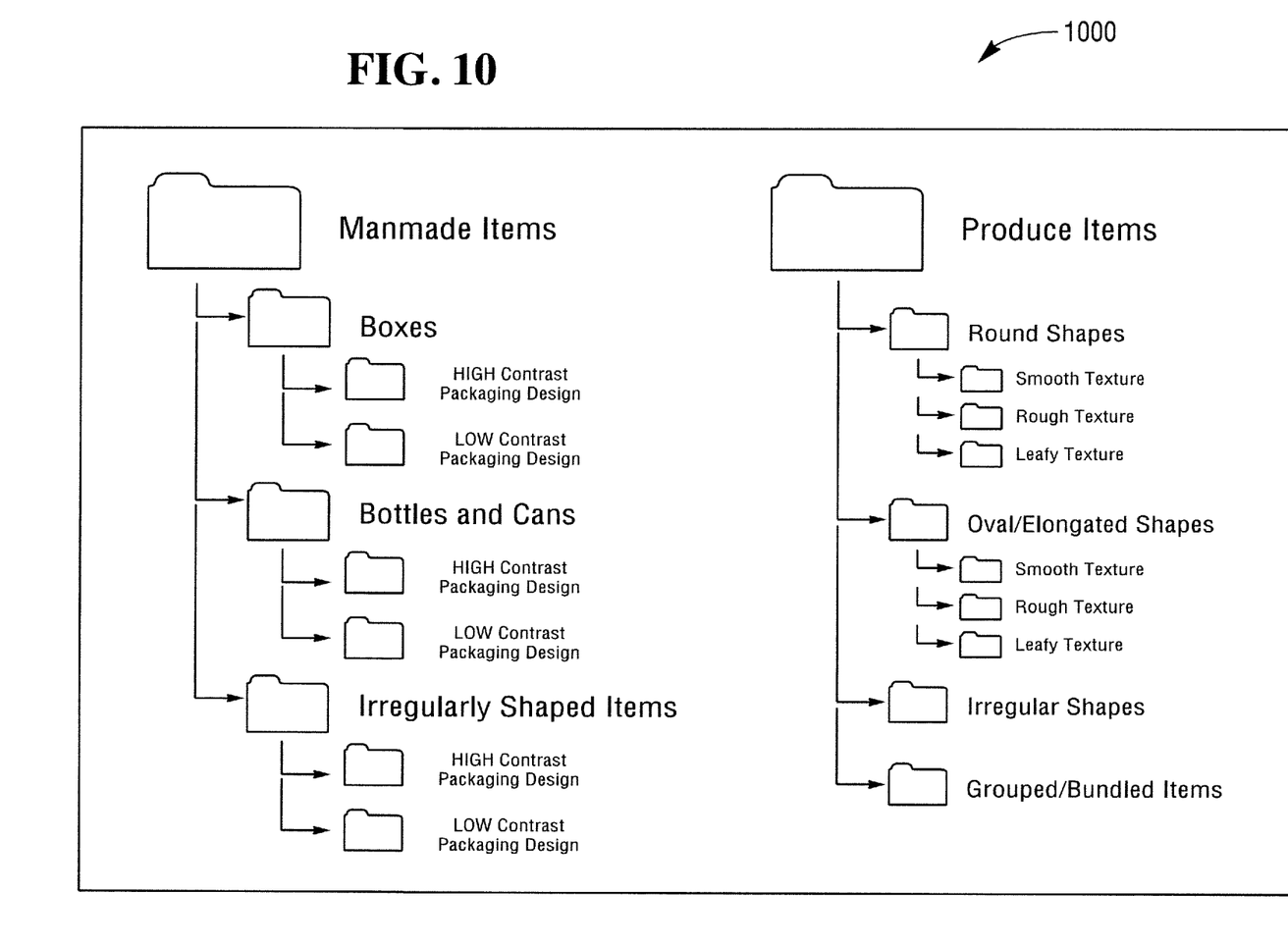
FIG. 10 shows an exemplary folder storage structure for categorization and sub-categorization of unknown items.

Proposed exemplary categorizations for man-made items 800 and produce items 900 are shown in FIGS. 8 and 9, respectively, and a proposed folder structure 1000 for storing image data is shown in FIG. 10. Preferably, product categorization database 53 of FIG. 2 follows the folder structure of FIG. 10.

While the present invention has been described in the context of a present embodiment, it will be recognized that it can be adapted and modified as technology advances and to adapt to varied contexts consistent consistently with the claims which follow below. From the above, it will be recognized the approaches of the present invention while disclosed in a presently preferred context of use of a low cost, low resolution, gray scale camera, they can also be leveraged to address a very wide array of store item recognition issues once system costs justify usage of more expensive, higher resolution color cameras. To recap, the present invention is significant in several ways. It can assist in detecting item substitution fraud at SSCO. It utilizes existing NCR SSCO hardware and platform, thus has minimal impact on solution integration or upgrade. It is quite effective for non-produce versus produce classification, as well as, produce or product sub-categorization. It only utilizes a low-resolution gray scale camera.

We claim:

1. Apparatus for verifying whether an item is produce or not comprising:
    a scale configured to weigh produce items;
    a hybrid scanner including: i) a laser scanner configured to read optical codes affixed to the items and 2) a camera configured to generate an image of the item when the item is placed within a field of view of the camera on the scale, wherein the hybrid scanner is configured to read the optical codes and generate the image at the same time;
    an illumination mechanism configured to selectively illuminate the field of view of the camera;
    a produce verification model database configured to store data for produce items to be verified; and
    a processor that executes software, which causes the processor to:
    control the camera and the illumination mechanism;
    retrieve a model for a particular item of produce to be weighed from the produce verification model database;
    control the camera to capture image data for the item;
    extract features from the captured image data;
    use the features to classify the image into categories representative of a produce item or a non-produce item based on: line features, corner features, edge features, texture features, and any characters or text features;
    wherein a total number of the line features is a factor relevant to determining the non-produce item as compared to the produce item, wherein a total number of the corner features is a second factor relevant to determining the non-produce item as compared to the produce item, wherein a total number of uniform patterns within the texture features is a third factor relevant to determining the produce item as compared to the non-produce item, and wherein a total number of the characters or the text features is fourth factor relevant to determining the non-produce item as compared to the produce item;
    use the classified image to sub-classify the image from the categories into sub-categories based on particular extracted features representing 1) packaging materials for the item that distinguishes between boxes, bottles, and cans, 2) a design of the packaging materials that distinguishes between high-contrast or low-contrast present in the image, 3) item object shape, 4) item object amount indicating a single item or a bundle of multiple items;
    fit the extracted features, the categories, and sub-categories to a retrieved model for the particular item of produce;
    and verify the item as produce or not based upon the fit of the extracted features to the retrieved model.

2. The apparatus of claim 1 wherein the processor further operates to verify the item is the particular item or not.

3. The apparatus of claim 1 further comprising:
    a touchscreen, and wherein the particular item is identified by a selection by a user from a menu displayed on the touchscreen.

4. The apparatus of claim 1 wherein if the item is not identified as produce, the processor communicates a potential error message to an attendant display station.

5. The apparatus of claim 1 wherein the illumination mechanism comprises a plurality of light emitting diodes (LEDs); and
    the processor controls the camera and LEDs to generate illuminated and non-illuminated background images, and illuminated and non-illuminated item images.

6. The apparatus of claim 5 wherein the processor computes a first difference of the two background images, bksub, and a second difference of the two item images, imgsub.

7. The apparatus of claim 6 wherein the processor subtracts bksub from imgsub to obtain, img, a difference of the first and second differences.

8. The apparatus of claim 7 wherein the camera comprises a low resolution gray scale camera also utilized to perform reading of two dimensional bar codes.

9. The apparatus of claim 8 wherein the processor generates a binary item segmentation map by thresholding img.

10. The apparatus of claim 1 wherein the processor extracts the line features, the corner features, the edge features and the texture features and applies feature detectors to select a group of most discriminating features.

11. Apparatus for categorizing an item as produce or non-produce comprising:
    a hybrid scanner including: i) a laser scanner configured to read optical codes affixed to the item, and ii) a camera configured to generate an image of the item when the item is placed within a field of view of the camera on the scale, and wherein the hybrid scanner is configured to read the optical codes and generate the image at the same time;
    a categorization database configured to store data for produce and non-produce items to be categorized; and
    a processor configured to execute software, which causes the processor to:
    retrieve product categorization criteria from the categorization database;
    control the camera to capture image data for the item;
    extract features from the captured image data including line features, corner features, edge features, texture features, and any characters or text features;

apply a retrieved categorization criteria; and
categorize the item as produce or non-produce based upon the application of the categorization criteria using the extracted features from the captured image data;
wherein a total number of the line features is a first factor relevant to determining the non-produce as compared to the produce, wherein a total number of the corner features is a second factor relevant to determining of the non-produce as compared to the produce item, wherein a total number of uniform patterns within the texture features is third factor relevant to determining the produce as compared to non-produce, and wherein a total number any of the characters or the text features is a fourth factor relevant to the non-produce as compared to the produce;
wherein classify includes processing to further sub-classify the item based the extracted features into sub-categories identified from: 1) packaging materials with the item that distinguishes between boxes, bottles, and cans, 2) a package design for the packaging materials that distinguishes between high-contrast or low-contrast present in the image, 3) item object shape, and 4) item object amount representing a single item or a bundle of multiple items.

12. The apparatus of claim 11 further comprising:
an illumination mechanism for selectively illuminating the field of view of the camera, and wherein the processor operates to control the illumination mechanism.

13. The apparatus of claim 12 wherein the illumination mechanism comprises a plurality of light emitting diodes (LEDs); and
the processor controls the camera and LEDs to generate illuminated and non-illuminated background images, and illuminated and non-illuminated item images.

14. The apparatus of claim 13 wherein the processor computes a first difference of the two background images, bksub, and a second difference of the two item images, imgsub.

15. The apparatus of claim 14 wherein the processor subtracts bksub from imgsub to obtain, img, a difference of the first and second differences.

16. The apparatus of claim 15 wherein the camera comprises a low resolution gray scale camera also utilized to perform reading of two dimensional bar codes.

17. The apparatus of claim 16 wherein the processor generates a binary item segmentation map by thresholding img.

18. The apparatus of claim 17 wherein the processor extracts item pixels using the segmentation map.

19. The apparatus of claim 18 wherein the processor extracts the line features, the corner features, the edge features and the texture features and applies feature detectors to select a group of most discriminating features.

20. The apparatus of claim 19 wherein the processor applies a probabilistic approach to classification and further classifies the item into a sub-category.

* * * * *